(12) United States Patent
Coleman et al.

(10) Patent No.: US 9,129,331 B2
(45) Date of Patent: Sep. 8, 2015

(54) METHOD AND SYSTEM FOR PROCESSING REQUISITIONS

(75) Inventors: Andrew Coleman, Vestal, NY (US); Macam S. Dattathreya, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 12/327,478

(22) Filed: Dec. 3, 2008

(65) Prior Publication Data

US 2010/0138310 A1 Jun. 3, 2010

(51) Int. Cl.
*G06Q 30/00* (2012.01)
*G06Q 30/06* (2012.01)
*G06Q 10/08* (2012.01)

(52) U.S. Cl.
CPC .......... *G06Q 30/0635* (2013.01); *G06Q 10/087* (2013.01); *G06Q 30/0601* (2013.01)

(58) Field of Classification Search
CPC ....... G06Q 30/02; G06Q 10/10; G06Q 10/06; G06Q 30/016; G06Q 30/0635; G06Q 10/087; G06Q 30/0601
USPC .......... 705/26, 27, 26.1, 27.1, 26.81
See application file for complete search history.

(56) References Cited

U.S. PATENT DOCUMENTS

| | | | |
|---|---|---|---|
| 5,319,542 A | 6/1994 | King, Jr. et al. | |
| 6,430,604 B1 * | 8/2002 | Ogle et al. | 709/207 |
| 7,117,165 B1 | 10/2006 | Adams et al. | |
| 7,350,698 B2 | 4/2008 | Viswanath et al. | |
| 7,912,899 B2 * | 3/2011 | Beauchamp et al. | 709/204 |
| 2003/0009385 A1 * | 1/2003 | Tucciarone et al. | 705/26 |
| 2003/0191677 A1 * | 10/2003 | Akkiraju et al. | 705/8 |
| 2003/0229722 A1 * | 12/2003 | Beyda | 709/310 |
| 2004/0006516 A1 * | 1/2004 | Anagol-Subbarao et al. | 705/26 |
| 2005/0021425 A1 * | 1/2005 | Casey | 705/28 |
| 2005/0086066 A1 | 4/2005 | Jhingan | |
| 2005/0102196 A1 | 5/2005 | Hung | |
| 2006/0011720 A1 * | 1/2006 | Call | 235/383 |
| 2006/0122894 A1 * | 6/2006 | McGary et al. | 705/26 |
| 2006/0178950 A1 | 8/2006 | Van Etten et al. | |
| 2007/0027740 A1 * | 2/2007 | Babu et al. | 705/9 |
| 2007/0162363 A1 | 7/2007 | Chollon et al. | |
| 2007/0208656 A1 | 9/2007 | Feaver et al. | |
| 2008/0162199 A1 * | 7/2008 | Smith et al. | 705/5 |
| 2009/0182592 A1 * | 7/2009 | Ballaro et al. | 705/7 |

OTHER PUBLICATIONS

"DOS Solutions", www.dossolutions.pwp.blueyonder.co.uk/, posted Jul. 28, 2007 [retrieved from Internet Archive on Feb. 2, 2010].*

(Continued)

*Primary Examiner* — Anne Georgalas
(74) *Attorney, Agent, or Firm* — George R. McGuire; John Pivnichny; Bond Schoeneck & King, PLLC

(57) ABSTRACT

A method and system for making a requisition for one or more items including providing a requisition module written as a service, using the requisition module to place one or more orders for one or more items, and monitoring the status of the one or more orders or the one or more items. When one or more orders is placed by a user of the module, an instant message or an email is provided to the user, wherein the instant message or email specifies the status of the one or more orders to the user.

12 Claims, 3 Drawing Sheets

(56) References Cited

OTHER PUBLICATIONS

"Electronic Customer Relationship Management (eCRM): Opportunities and Challenges in a Digital World," by Aileen Kennedy, Irish Marketing Review: 2006; 18, 1/2.*

"Software review: Self-service delivery and the growing roles of channels," by Shaun Doyle, Journal of Database Marketing and Customer Strategy Management (2007) 14, 150-159.* http://www.webopedia.com/TERM/W/Web_services.html.

* cited by examiner

METHOD AND SYSTEM FOR PROCESSING REQUISITIONS

FIELD OF INVENTION

The present invention relates generally to methods and systems for providing and receiving information about requisitions. More particularly, the present invention relates to monitoring the status of requisitions.

BACKGROUND

Procurement is the acquisition of goods and/or services at the best possible total cost of ownership, in the right quantity and quality, at the right time, in the right place and from the right source for the direct benefit or use of corporations, or individuals, generally via a contract. Simple procurement may involve nothing more than repeat purchasing. Complex procurement could involve finding long term partners that might fundamentally commit one organization to another. Almost all purchasing decisions include factors like delivery and handling, marginal benefit, and price fluctuations. Procurement generally involves making buying decisions under conditions of scarcity. If good data are available, it is good practice to make use of economic analysis methods such as cost-benefit analysis or cost-utility analysis.

An important distinction is made between analysis without risk and those with risk. Where risk is involved, either in the costs or the benefits, the concept of expected value may be employed. Based on the consumption purposes of the acquired goods and services, procurement activities are often split into two distinct categories. The first category being direct, production-related procurement and the second being indirect, non-production-related procurement.

Direct procurement occurs in manufacturing settings only. It encompasses all items that are part of finished products, such as raw material, components and parts. Direct procurement, which is the focus in supply chain management, directly affects the production process of manufacturing firms. In contrast, indirect procurement activities concern "operating resources" that a company purchases to enable its operations. It comprises a wide variety of goods and services, from standardized low value items like office supplies and machine lubricants to complex and costly products and services like heavy equipment and consulting services.

Procurement systems are well known. A buyer searches a catalog or a catalog database, locates a material of interest, and places an order, also sometimes referred to as a requisition. A supplier then fulfills the order. However, special orders greatly complicate and slow down the entire procurement process as well as greatly increase procurement expense. In practice, a buyer who cannot find an item located in a catalog must fill out a special requisition, also known as a special order request. However, no order is even placed until a potential supplier and related cost and delivery information is provided to the buyer for consideration.

The order or requisition is then sent to a procurement fulfillment organization. A fulfillment specialist reviews the special requisition and manually determines if there are any potential suppliers that can fulfill the special requisition. Potential suppliers are then contacted and they respond accordingly. Each of the suppliers has their own way of describing the items it carries. Thus, the fulfillment specialist must manually review each supplier proposal and determine which ones appear to be most favorable to the buyer.

Many current web based procurement requisition systems utilize time consuming processes to procure and monitor the requisition status of items ordered. The systems are no different for the person ordering frequently than for the person ordering only occasionally. In current systems, requestors or purchasers must use a series of user interface screens to search and purchase items through a series of complex business process screens to submit the requisition for fulfillment. Moreover, the purchaser may only be notified at certain steps in the procurement process, but not for others. Furthermore, purchasers must login to the procurement application to monitor requisition status. There remains a need to provide a simplified process for the purchasers who frequently purchase the same items.

SUMMARY

According to one embodiment of the present invention, a method for making a requisition for one or more items is provided, the method including providing a requisition module written as a service, using the requisition module to place one or more orders for one or more items, and monitoring the status of the one or more orders or the one or more items.

In a further aspect of the method wherein the one or more orders is placed by a user of the module, the method includes providing an instant message or an email to the user wherein the instant message or email specifies the status of the one or more orders to the user. The method includes providing the status of each of the one or more items in the one or more orders.

In another aspect of the method, the status of the one or more orders and/or of the one or more items includes the position of the one or more orders and/or of the one or more items, wherein the position ranges from the point at the onset of placing of the one or more orders to the receipt of the one or more orders and/or of the one or more items.

In yet another aspect, the method provides the user with the option to specify at which position or positions of the one or more orders and/or of the one or more items the user will receive an instant message or email. Examples of positions include, but are not limited to, ordered, back ordered, at supplier preparation, in billing, in warehouse, in shipping, and/or out for delivery.

In still a further aspect of the method, an email message is sent to the user if the user is not logged in to an instant messaging facility. The user may specify the number of attempts to send an instant message before an email is sent.

In one more aspect of the method, the requisition module uses simple object access protocol (SOAP) to provide a web service.

In another embodiment of the present invention, a system for making a requisition for one or more items is provided, wherein the system includes a requisition module, wherein the requisition module is written as a service, and an instant messaging/email module linked to the requisition module, wherein the requisition module creates a requisition, and wherein the instant messaging/email module provides the status of the requisition.

In a further aspect, the system includes a procurement application, an application database and a configuration database, wherein the configuration database creates a configuration table comprising a user's specifications for receiving a status of a requisition. The user's specifications can include status codes for needed status notifications, instant messaging addresses, email addresses, the number of times to attempt instant messaging, a request to send email upon an instant message error or upon failed instant messaging attempts, a request to send a URL to view the status and/or the most recent status notification sent. The status codes can include, but are not limited to ordered, back ordered, at supplier preparation, in billing, in warehouse, in shipping, and/or out for delivery.

In another aspect of the system, the requisition module uses simple object access protocol (SOAP) to provide a web service.

In yet another embodiment of the present invention, a computer program product encoded in a computer readable medium for instructing a system to make a requisition for one or more items is provided wherein the program code is configured to cause the computer to perform the method including providing a requisition module written as a service, using the requisition module to place one or more orders for one or more items, and monitoring the status of the one or more orders or the one or more items.

In a further aspect of the computer program product, the one or more orders is placed by a user of the module and the program code is further configured to provide an instant message or an email to the user wherein the instant message or email specifies the status of the one or more orders to the user and/or of the one or more items in the one or more orders.

In another aspect of the computer program product, the status of the one or more orders and/or of the one or more items specifies the position of the one or more orders and/or of the one or more items, wherein the position ranges from the point at the onset of placing of the one or more orders to the receipt of the one or more orders and/or of the one or more items.

In yet another aspect of the computer program product, the program code is further configured to provide the user with the option to specify at which position or positions of the one or more orders and/or of the one or more items the user will receive an instant message or email. Examples of positions include, but are not limited to, ordered, back ordered, at supplier preparation, in billing, in warehouse, in shipping, and/or out for delivery.

In still a further aspect of the computer program product, the program code is further configured to send an email message if the user is not logged in to an instant messaging facility.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION

Figure 1:
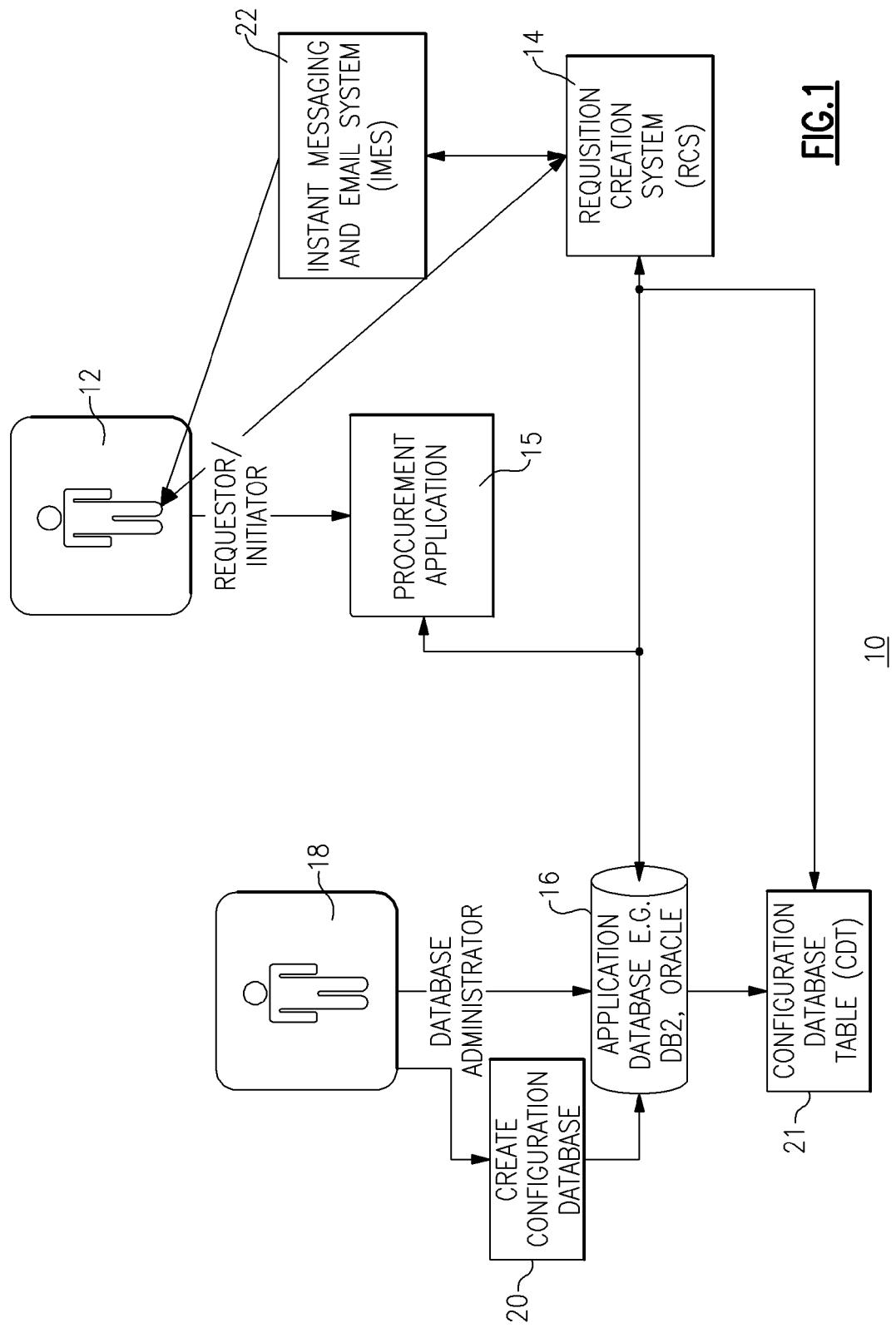
FIG. 1 shows an embodiment of a system herein.

For the purposes of this patent description and claims, the inventors intend that the following terms be understood to have the following definitions.

"Present invention" means at least some embodiments of the present invention; references to various feature(s) of the "present invention" throughout this document do not mean that all claimed embodiments or methods include the referenced feature(s).

"SOAP" (Simple Object Access Protocol) is a protocol specification for exchanging structured information in the implementation of Web Services in computer networks. It relies on Extensible Markup Language (XML) as its message format and usually relies on other Application Layer protocols, most notably Remote Procedure Call (RPC) and Hypertext Transfer Protocol (HTTP) for message negotiation and transmission. SOAP forms the foundation layer of the web services protocol stack providing a basic messaging framework upon which abstract layers can be built. As an example of how SOAP procedures can be used, a SOAP message could be sent to a web service enabled web site, for example, a house price database, with the parameters needed for a search. The site will return an XML-formatted document with the resulting data (prices, location, features, etc). As the data is returned in a standardized machine-parsable format, it may be integrated directly into a third-party site.

"Web Service" is a software system designed to support interoperable machine-to-machine interaction over a network. Web services are frequently just Web Application Programming Interfaces (APIs) that can be accessed over a network, such as the Internet, and executed on a remote system hosting the requested services.

"Extensible Markup Language" (XML) is a general-purpose specification for creating custom markup languages. It is classified as an extensible language because it allows its users to define their own elements. Its primary purpose is to help information systems share structured data, particularly via the Internet, and it is used both to encode documents and to serialize data.

Enterprise resource planning (ERP) is an enterprise-wide information system designed to coordinate all the resources, information, and activities needed to complete business processes such as order fulfillment or billing. An ERP system supports most of the business system that maintains in a single database the data needed for a variety of business functions such as Manufacturing, Supply Chain Management, Financials, Projects, Human Resources and Customer Relationship Management. An ERP system is based on a common database and a modular software design. The common database can allow every department of a business to store and retrieve information in real-time. The information should be reliable, accessible, and easily shared. The modular software design should mean a business can select the modules they need, mix and match modules from different vendors, and add new modules of their own to improve business performance. Ideally, the data for the various business functions are integrated. In practice the ERP system may comprise a set of discrete applications, each maintaining a discrete data store within one physical database.

Embodiments of the invention provide a system and method for monitoring and receiving status notifications of requisitions.

Reference is made to FIG. 1, which shows a system 10 carrying out the procurement of one or more orders. A requester is shown at 12, initiating or requesting an order. The order is created at the requisition creation system (RCS) 14 using procurement application 15. Application 15 can be an enterprise resource planning (ERP) system, which coordinates all the resources, information and activities needed to complete business processes such as order fulfillment or billing. RCS 14 is a web service component, which provides the ability to create multiple requisitions without a series of user interfaces. RCS 14 provides a system that allows users to specify details regarding the items being order, including but not limited to, catalog identification, part numbers, quantity, requestor/initiator web identification and accounting details. Access to RCS 14 may be granted using simple object access protocol or SOAP.

RCS 14 is linked to an application database 16, such as, for example, the ORACLE® database or the IBM® DB2® database. The order is received by application database 16 and a database administrator 18 creates a configuration database 20, which creates a configuration database table (CDT) 21. Procurement application 15, based on the properties of the order placed by requestor 12, populates CDT 21, which lists the requisition number and status notification needed for each requisition. Table 1 below is an example of a CDT.

messaging is not working or the user is not logged in, an email may be sent to the user as an alternate notification method. When the status is instant messaged to the user, it provides an application URL upon which the user can "click" and go to the specific screen in the procurement application to view requisition details.

TABLE 1

| 1. REQUISITION ID | 2. NOTIFICATION STATUS | 3. IM EMAIL ID | 4. NUMBER OF IM TRIES | 5. SEND EMAIL WHEN IM ERROR OCCURS | 6. SEND URL TO VIEW STATUS | 7. LAST IM STATUS |
|---|---|---|---|---|---|---|
| R100 | S1~S2~S3~S4 | johndoe@xx.com | 2 | Y | Y | S1 |
| R200 | S1~S2 | johndoe@xx.com | 1 | N | N | S2 |
| R300 | S1 | johndoe@xx.com | 1 | Y | Y | S1 |
| R400 | S1 | johndoe@xx.com | 0 | Y | Y | S1 |

Once the configuration table is created, RCS 14 updates the information in the table. RCS 14 is linked to an Instant Messaging and Email System (IMES). Typically, a configuration table such as that set forth in Table 1 includes the requisition identification, which is the number given to the order or items in an order. The second column is the notification status column, which lists the number and type of status notifications requested by the initiator. For example, for R100, the initiator has requested status updates at four stages of the process. Status request 1, "S1," may represent the location at the time of placing the order, e.g., in the warehouse; "S2" may represent the status after it moves from the warehouse, "retrieved from the warehouse"; "S3" may represent "in shipping"; and "S4" may represent "item has been sent." For R200, S1 could mean the same as S1 for R100, or could mean something else, e.g., "in shipping." The status request may be defined by the requester or by the provider, although it is preferable to the requester that the requester defines and controls when and how many notifications are necessary. It is possible that the requester not require any status notifications or it is possible that the requester requires a status notification for every step or movement of the item in the process.

The next column of the configuration table provides the instant messaging and email address of the requester. The requester is first contacted by instant messaging and column four of the configuration table lists the number of times that the requester requests attempts to instant message the requester. Column five lists whether or not the requester wants an email sent if an instant messaging error occurs; a Y is inserted for Yes and an N is inserted for No. Column six lists whether or not the requester wants a URL sent to view the status; a Y is inserted for Yes and an N is inserted for No. Column seven lists the identification of the last status notification that was sent. For R100, the last notification sent was S1, which means that three more status notifications will be sent to the requestor when the status changes. For R300 and R400, both requisitions only requested one status notification, i.e., S1. Column 7 states that the S1 notification has been sent for both R300 and R400. Accordingly, the rows for R300 and R400 may be removed from the configuration table, since the required status notifications have been sent and are complete.

In accordance with the embodiments herein, the users/requestors can have status reports instantly, via instant messaging, without having to login to the application to monitor requisition status when the requisition is in progress. Moreover, the requisition can be created without having to login to the procurement application. If the user/requestor's instant The IMES periodically reads the configuration database and procurement application database tables. For each of the requisition identification numbers listed in the CDT, based on its configuration, a status instant message or email is sent to the email id specified for a given requisition. The instant message or email is sent for all the status notifications requested and configured in the "Status Notification Needed" column. When the requisition reaches its final status, the IMES sends an instant message/email for the last status and removes the row from the CDT for a given requisition. The IMES keeps track of the last status notification that was sent "Last IM Status" column. The system herein is fully applicable to hand held devices, such as BLACKBERRY® devices, cell phones, personal digital assistants, and other types of devices/machines that support email communication.

Figure 2:
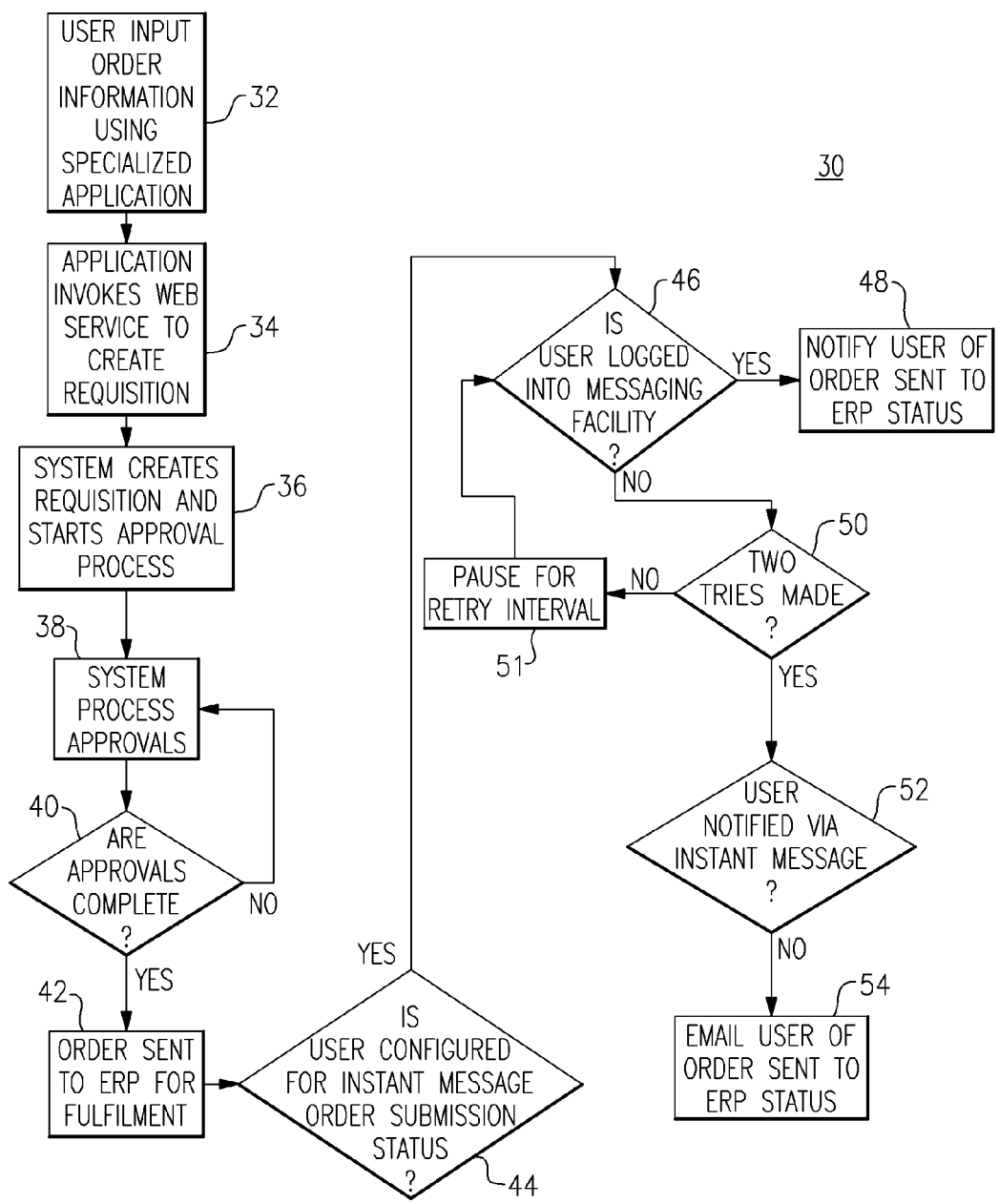
FIG. 2 shows the logic of a method embodiment herein.

Reference is made to FIG. 2 which shows an embodiment of a method 30 for sending a status notification, once an order has been approved for fulfillment. At step 32 the user inputs order information to the RCS. At step 34, the RCS invokes a web service to create a requisition. The RCS, in conjunction with an application data base creates the requisition and starts the approval process at step 36. Examples of items ordered through the process include anything and everything that could be ordered electronically, such as, but not limited to, office supplies, computers, manufacturing materials, chemicals, and building materials.

The approval process may require determining whether the requester is authorized to receive certain items, such as specialty chemicals or certain materials considered hazardous. At step 38, the system processes the approvals. At step 40, the system queries whether the approvals are complete. It the answer is no, the process loops back up to step 38 until all approvals are complete. Once the approvals are complete, the order is sent to an enterprise resource planning (ERP) system at step 42. The ERP system coordinates all the resources, information and activities needed to complete business processes such as order fulfillment or billing.

At step 44, the system queries whether the user is configured for instant message order submission status. If the answer is yes, the system queries at step 46 whether the user is logged into an instant messaging facility. If the answer is yes, the user is notified at step 48. If the answer is no, at step 50, the system waits and retries to send the text message. The number of times to retry will be based on the information in the configuration table. In this example, the number of tries will be two. The system waits for a retry interval at step 51 and an attempt is made at step 50. The system queries whether the user is logged into the instant messaging facility at step 46. If yes, the user is notified at step 48. If the answer is no, the system waits for a retry interval and then makes a second attempt to contact the user.

After two attempts to contact the user have been made, the system queries, at step 52, whether the user was contacted by instant messaging. If the answer is no, an email is sent to the user at step 54.

Figure 3:
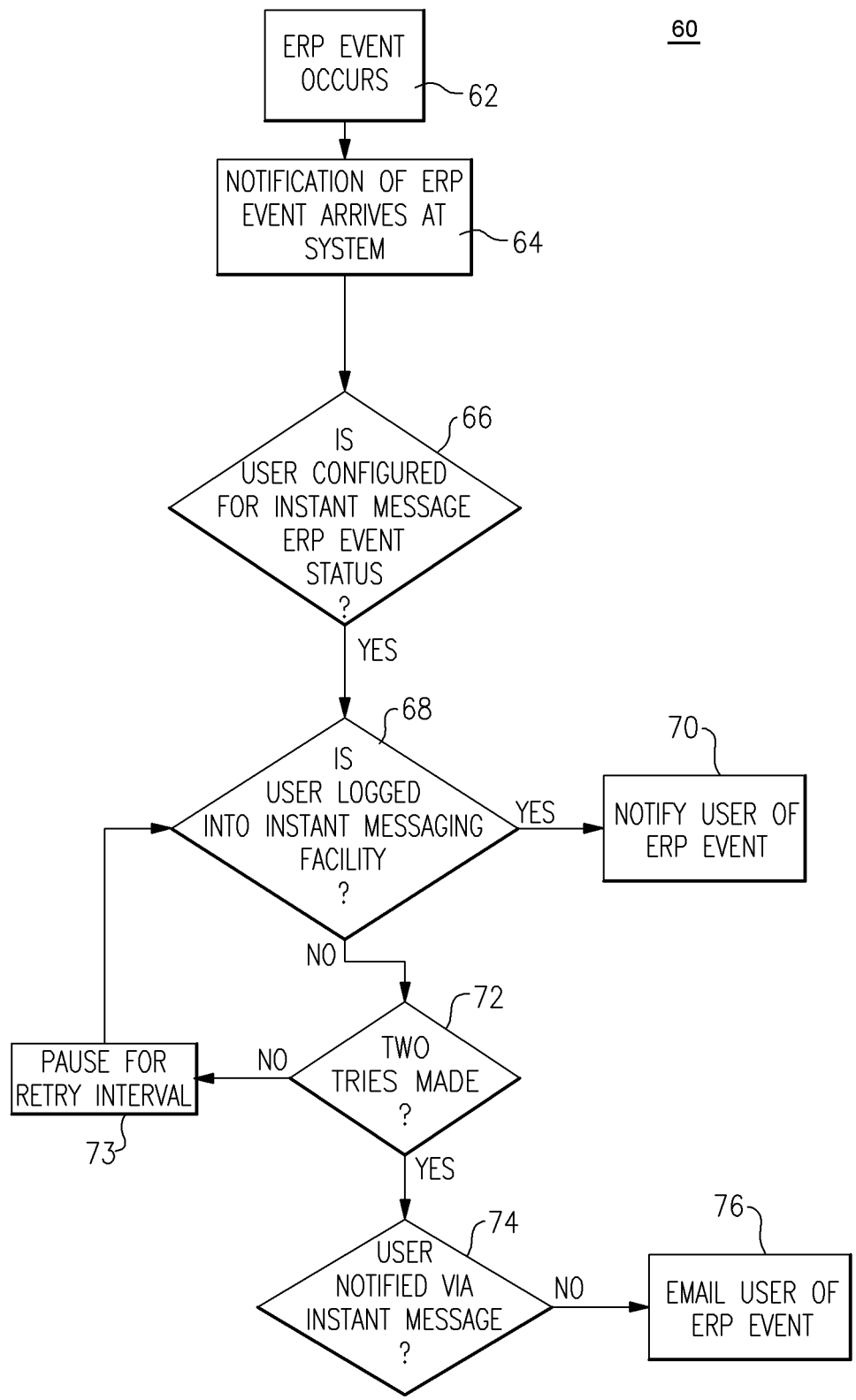
FIG. 3 shows the logic of a method embodiment herein.

As stated above, the user may request the status of the order at any point in the ordering process, from the placement of the order to the receipt of the order. Reference is made to FIG. 3, which shows an embodiment of a method 60 for reporting an event in the order-to-shipment process. At step 62 an ERP event occurs. An ERP event can include anything that occurs during the order-to-shipment process, such as, but not limited to, checking inventory for the order, retrieving the order from inventory, approving the order, packaging the order, invoicing the order, and shipping the order.

At step 64, the system is notified of the occurrence of an ERP event. At step 66, the system queries whether the user is configured for instant messaging of the ERP event status. If the answer is yes, at step 68 the system queries whether the user is logged into an instant messaging facility. If the answer is yes, the user is notified of the ERP by an instant message at step 70. If the answer is no, at step 72, the system retries and waits at step 73, and continues to wait and retry for the number of times specified in the configuration table. If any of the attempts are successful, i.e., the user is logged into the facility (at step 68), the user is notified of the event at step 70.

After the system has performed the required amount of attempts, at step 74, the system queries whether the user was notified via an instant message. If the answer is no, the user is sent an email to notify the user of the ERP event at step 76.

Embodiments herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, code to provide the requisition module written as a service, code to provide placement of an order, code to monitor the status of the one or more orders or the one or more items in an order, code to provide an instant message or an email to the user of the system, code to specify the status of the one or more orders to the user, code to provide the position of the one or more orders, code to provide the user with the option to specify at which position or positions of the one or more orders and/or of the one or more items the user will receive an instant message or email, and code to send an email message to the user if the user is not logged in to an instant messaging facility.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method for making a requisition on a computer for one or more items comprising:

providing a first computer configured to receive requisition data, wherein the requisition data comprises one or more orders for one or more items and a user's specification for receiving a status of the one or more orders for the one or more items;

receiving the requisition data at the first computer;

sending the requisition data to a second computer, the second computer having a processor, a requisition module, a procurement application, and a configuration database embodied therein;

creating, using the processor, a configuration database table in response to receipt of the requisition data at said second computer;

populating, by the processor, the configuration database table with the user's specification for receiving the status of the one or more orders for the one or more items, wherein the user's specification comprises an election of which of a plurality of possible triggering events will result in notification of a status to the user, and further wherein said procurement application populates the configuration database table in response to said requisition data;

initiating the requisition module of the second computer to create a requisition using the requisition data comprising the one or more orders for one or more items;

monitoring the one or more orders or the one or more items for the occurrence of at least one of said plurality of possible triggering events;

querying, upon occurrence of at least one of said plurality of possible triggering events, the populated configuration database to determine whether the triggering event was elected by the user for notification of a status to the user;

accessing by the processor, if the triggering event was elected by the user for notification of a status to the user, an instant messaging system;

determining, by the processor, whether the user is currently logged into the instant messaging system and, if so, providing via the instant messaging system the status of the one or more orders or the one or more items to the user;

waiting, by the processor, if the user is not currently logged into the instant messaging system, for a predetermined amount of time to determine again whether the user is currently logged into the instant messaging system and, if so, providing via the instant messaging system the status of the one or more orders or the one or more items to the user;

providing, by the processor, if the user is not logged into the instant messaging system after a predetermined number of attempts, the status of the one or more orders or the one or more items to the user via email.

2. The method of claim 1 wherein the status of the one or more orders or of the one or more items comprises a position of the one or more orders or of the one or more items, wherein the position comprises a first point at placing of the one or more orders, a second point at receipt of the one or more orders or of the one or more items, or one or more points between the first point and the second point, wherein the one or more in-between points comprises a location of the one or more orders or one or more items.

3. The method of claim 2 wherein the position comprises ordered, back ordered, at supplier preparation, in billing, in warehouse, in shipping, or out for delivery.

4. The method of claim 1 wherein the user specifies the number of attempts to send the one or more instant messages before the one or more emails is sent.

5. The method of claim 1 wherein the requisition module uses simple object access protocol (SOAP) to provide a web service.

6. A system for making a requisition for one or more items comprising:
- a first computer configured to receive requisition data, wherein the requisition data comprises one or more orders for one or more items and a user's specification for receiving a status of the requisition, wherein the user's specification comprises an election of which of a plurality of possible triggering events will result in notification of a status to the user;
- a second computer comprising:
  - a processor comprising an instant messaging/email module linked to the requisition module;
  - a requisition module to create a requisition based on the requisition data,
  - wherein the requisition module is written as a service;
  - a procurement application; and
  - a configuration database;
- wherein the requisition module invokes a web service to create a requisition;
- wherein the configuration database creates a configuration database table comprising the user's specification for receiving the status of the requisition in response to receipt of the requisition data at said second computer;
- wherein the procurement application populates the configuration database table with the user's specification for receiving the status of the requisition;
- wherein the requisition is created by placing the one or more orders for the one or more items;
- wherein the processor is configured to monitor the one or more orders or the one or more items for the occurrence of at least one of said plurality of possible triggering events;
- wherein the processor is configured to query, upon occurrence of at least one of said plurality of possible triggering events, the populated configuration database to determine whether the triggering event was elected by the user for notification of the status to the user;
- wherein the instant messaging/email module is configured to access, if the triggering event was elected by the user for notification of the status to the user, an instant messaging system;
- wherein the instant messaging/email module is configured to determine whether the user is currently logged into the instant messaging system and, if so, provide via the instant messaging system a status of the one or more orders or the one or more items to the user based on the populated configuration database table;
- wherein the instant messaging/email module is configured to wait, if the user is not currently logged into the instant messaging system, for a predetermined amount of time to determine again whether the user is currently logged into the instant messaging system and, if so, providing via the instant messaging system the status of the one or more orders or the one or more items to the user;
- wherein the instant messaging/email module is configured to provide, if the user is not logged into the instant messaging system after a predetermined number of attempts, the status of the one or more orders or the one or more items to the user via email.

7. The system of claim 6 wherein the user's specifications comprise status codes for status notifications.

8. The system of claim 7 wherein the status codes comprise ordered, back ordered, at supplier preparation, in billing, in warehouse, in shipping, or out for delivery.

9. The system of claim 6, wherein the requisition module uses simple object access protocol (SOAP) to provide a web service.

10. A computer program product encoded in a non-transitory computer readable medium for instructing a system to make a requisition for one or more items, the program product configured to cause a computer to perform a method comprising:
- receiving requisition data on a first computer;
- sending the requisition data to a second computer, wherein the second computer comprises a processor, a requisition module written as a service, a procurement application, and a configuration database;
- creating a configuration database table;
- populating the configuration database table with the user's specification for receiving a status of one or more orders for one or more items in response to said requisition data, wherein the user's specification comprises an election of which of a plurality of possible triggering events will result in notification of the status to the user, and further comprises an election of at least two methods for notification of said status to said user upon the occurrence of an elected triggering event, and further;
- using the requisition module to place the one or more orders for the one or more items; and
- monitoring the one or more orders or the one or more items for the occurrence of at least one of said plurality of possible triggering events;
- accessing by the processor, if the triggering event was elected by the user for notification of the status to the user, an instant messaging system;
- determining, by the processor, whether the user is currently logged into the instant messaging system and, if so, providing via the instant messaging system the status of the one or more orders or the one or more items to the user;
- waiting, by the processor, if the user is not currently logged into the instant messaging system, for a predetermined amount of time to determine again whether the user is currently logged into the instant messaging system and, if so, providing via the instant messaging system the status of the one or more orders or the one or more items to the user;
- providing, by the processor, if the user is not logged into the instant messaging system after a predetermined number of attempts, the status of the one or more orders or the one or more items to the user via email.

11. The computer program product of claim 10 wherein the status of the one or more orders or of the one or more items comprises a position of the one or more orders or of the one or more items, wherein the position comprises a first point at placing of the one or more orders, a second point at receipt of the one or more orders or of the one or more items or one or more points between the first point and the second point, wherein the one or more in-between points comprises a location of the one or more orders or one or more items.

12. The computer program product of claim 11 wherein the position or positions comprise(s) ordered, back ordered, at supplier preparation, in billing, in warehouse, in shipping, or out for delivery.

* * * * *